Patented Sept. 12, 1922.

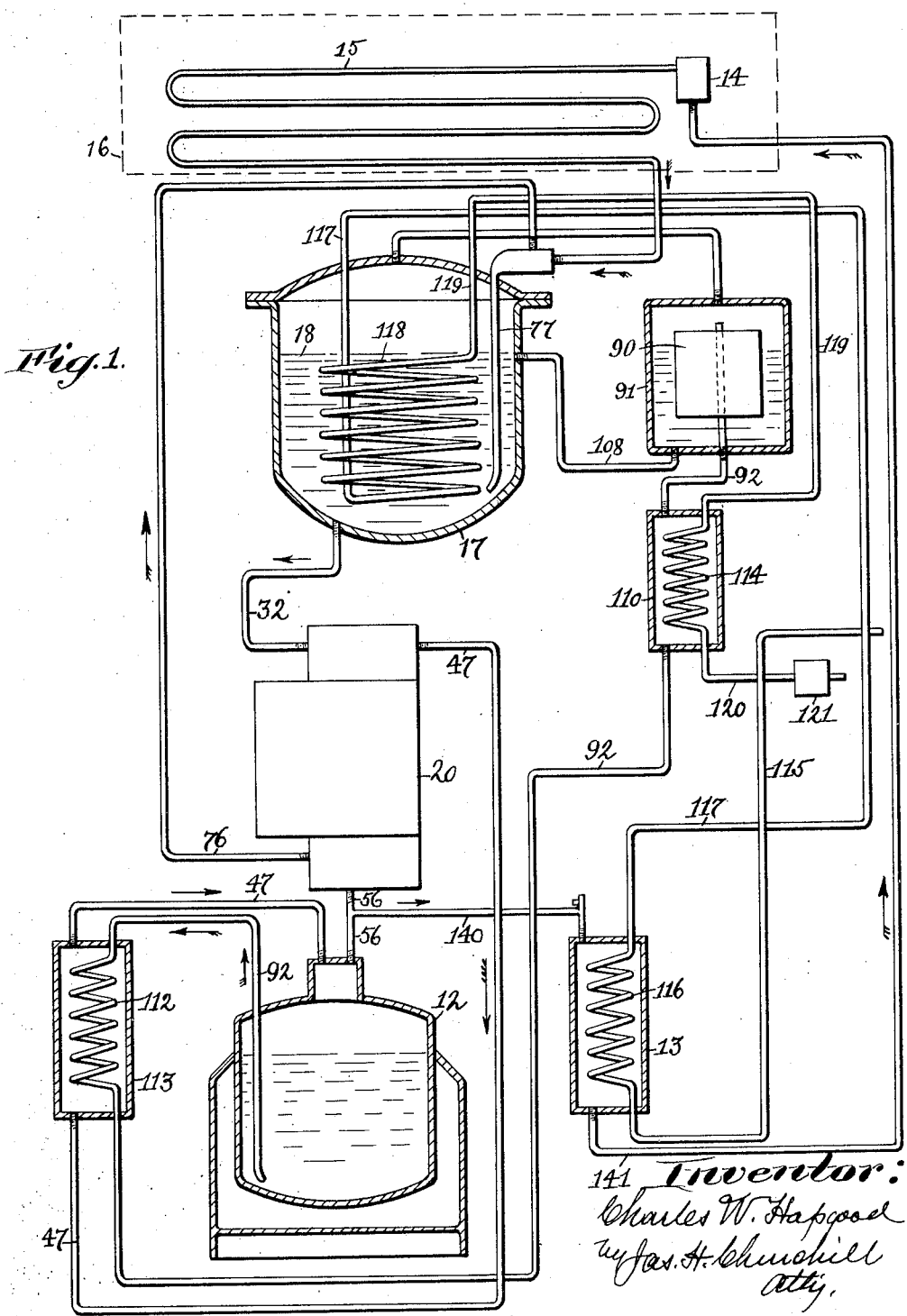

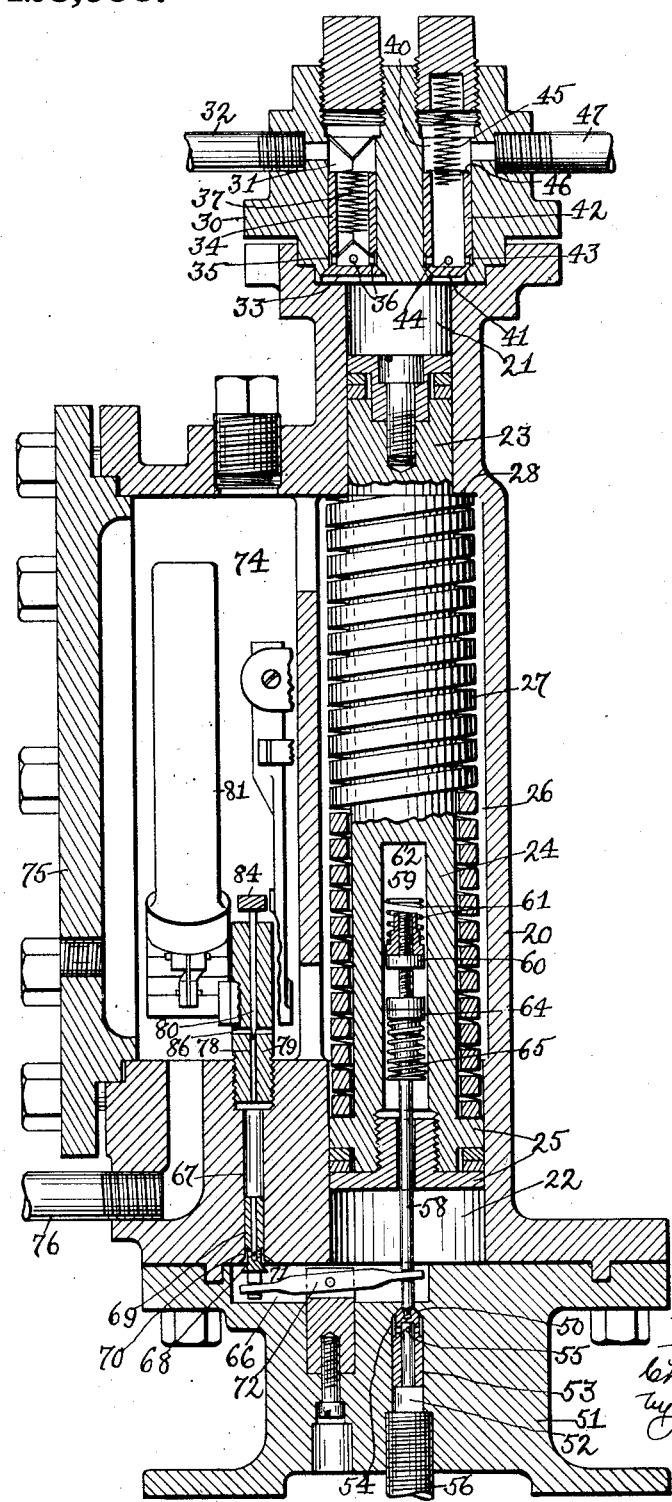

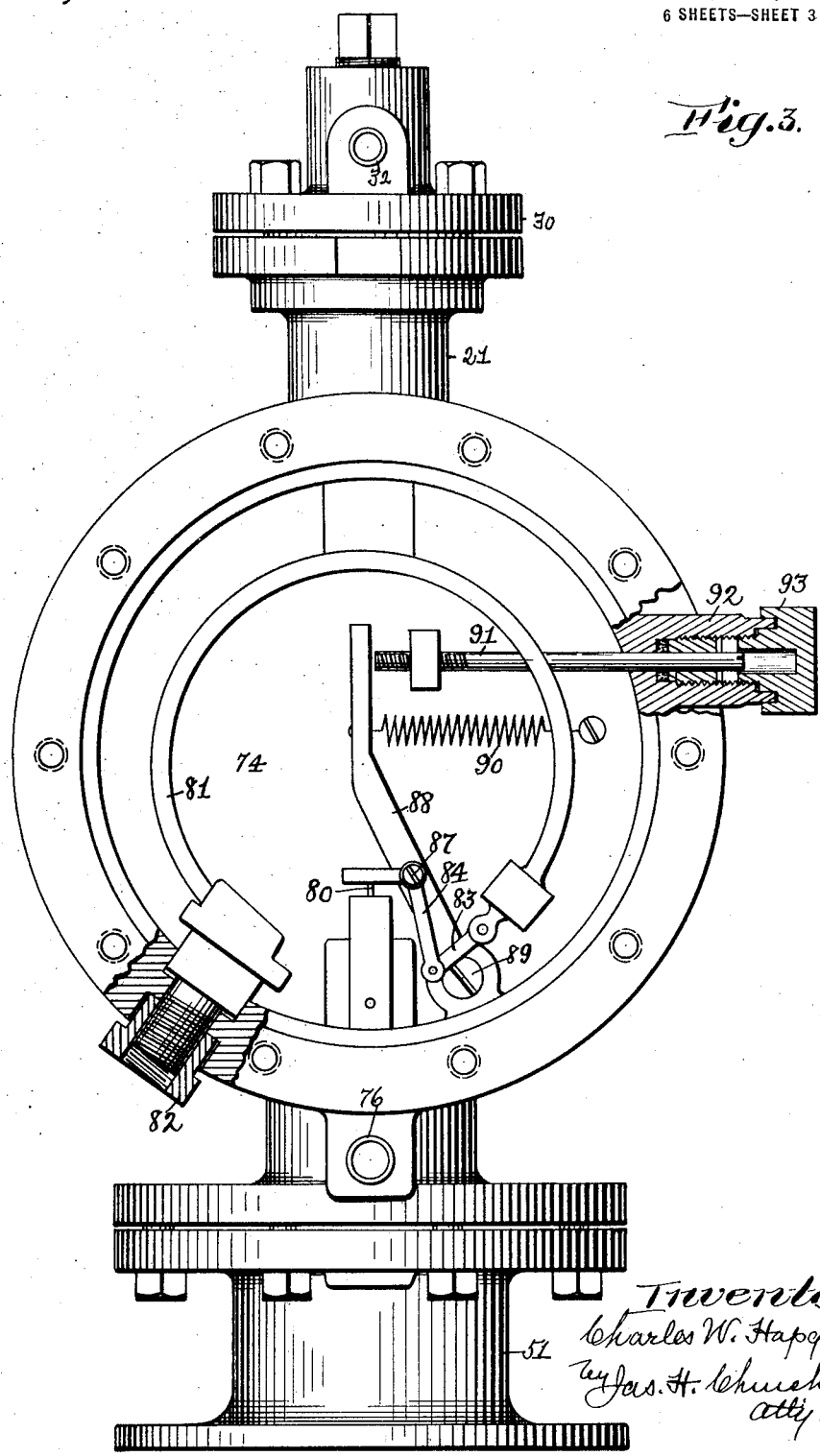

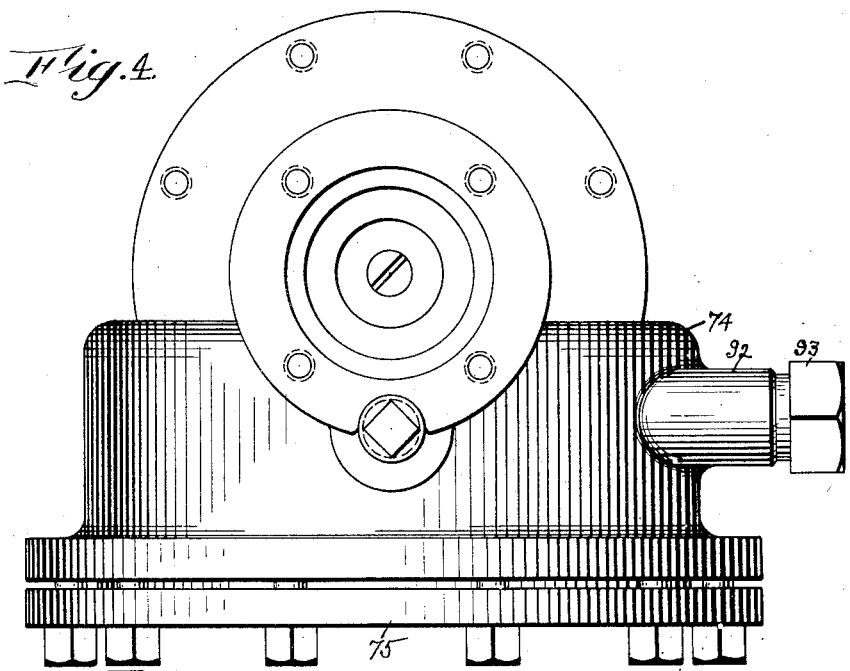
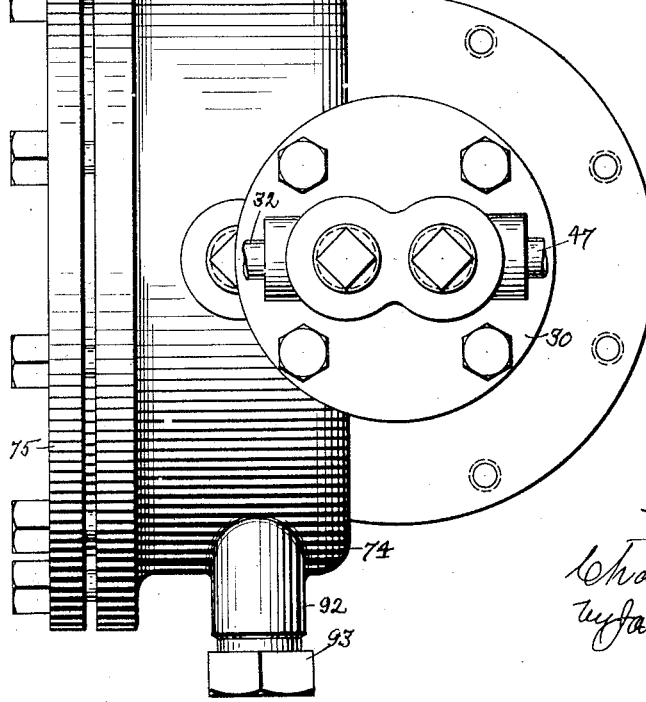

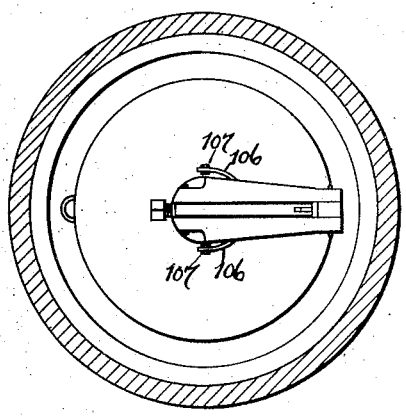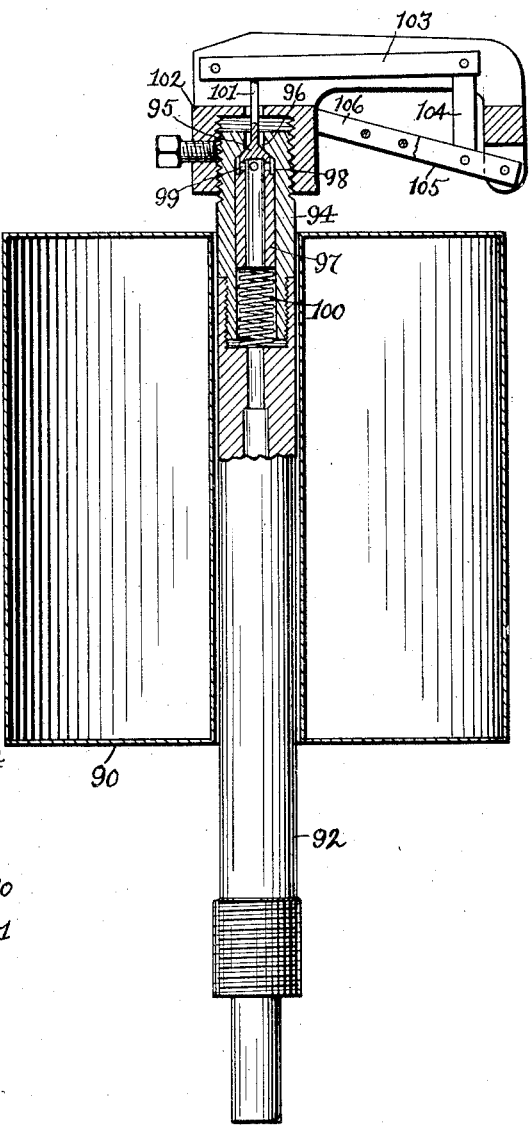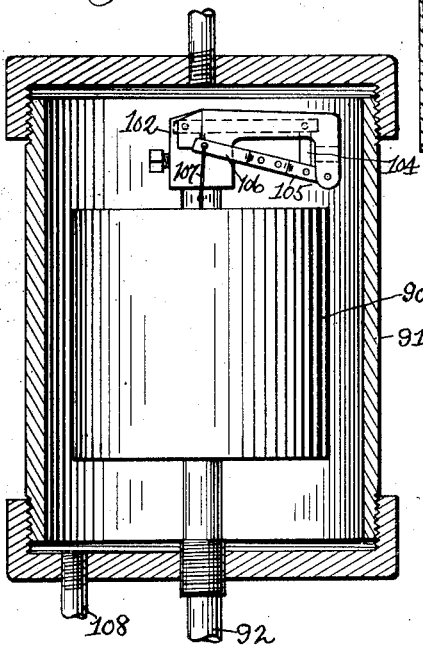

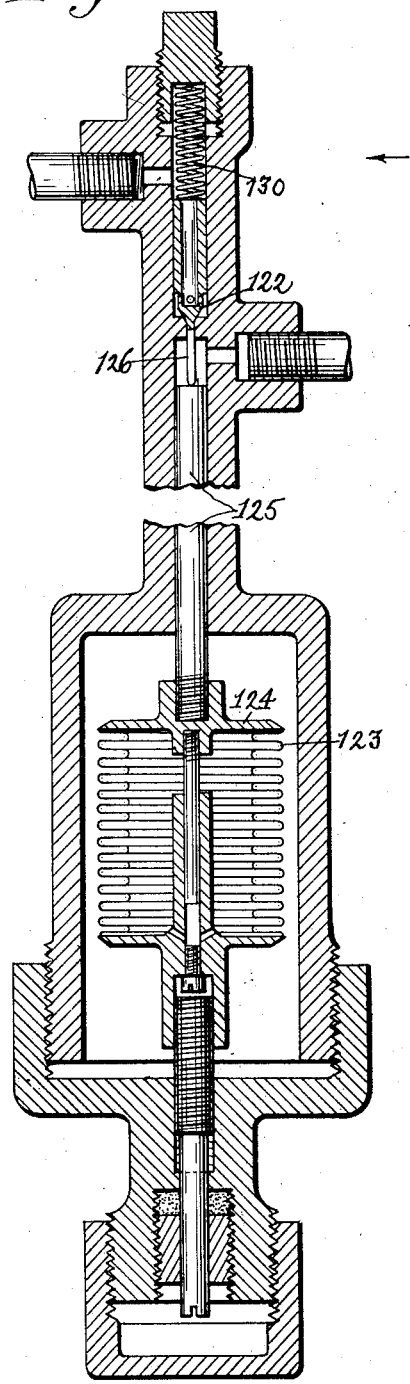
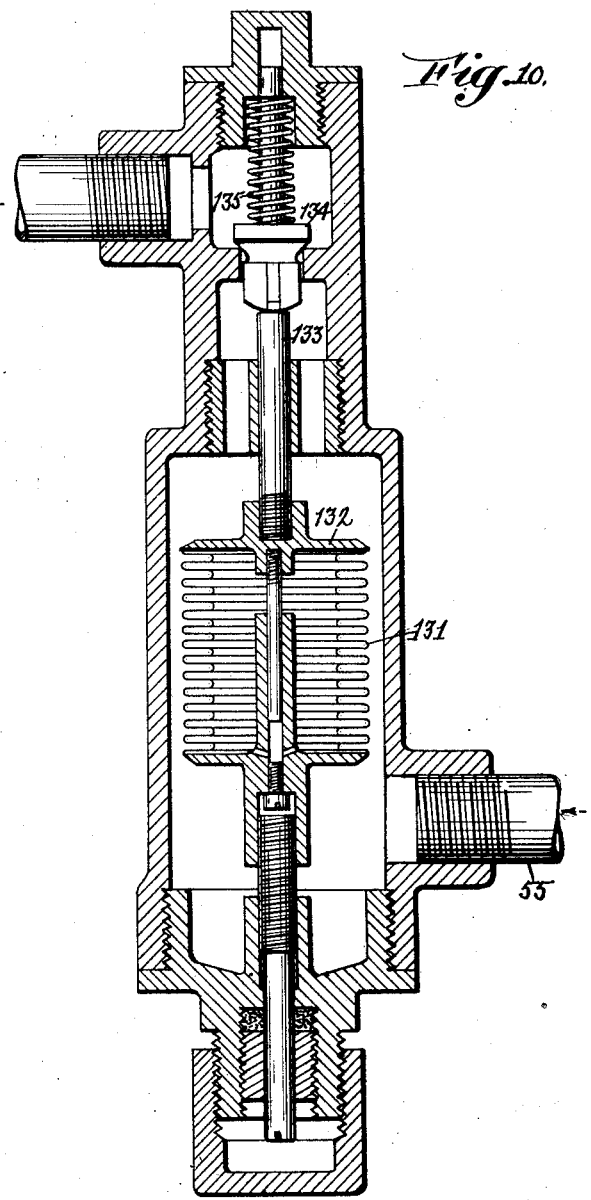

1,428,958

UNITED STATES PATENT OFFICE.

CHARLES W. HAPGOOD, OF BOSTON, MASSACHUSETTS.

REFRIGERATING APPARATUS.

Application filed November 18, 1918. Serial No. 262,948.

*To all whom it may concern:*

Be it known that I, CHARLES W. HAPGOOD, a citizen of the United States, residing in Boston, in the county of Suffolk and State of Massachusetts, have invented an Improvement in Refrigerating Apparatus, of which the following description, in connection with the accompanying drawings, is a specification, like characters on the drawings representing like parts.

This invention relates to a refrigerating apparatus or system of the absorption type, and has for its object to provide a continuous absorption system or apparatus, which is capable of general use but which is especially adapted for small units such as households, and which is automatic in operation, reliable, hermetically sealed, safe to use and inexpensive in cost and maintenance.

The present invention is an improvement upon the continuous absorption refrigerating system shown and described in another application Se. No. 132889 filed by me November 22, 1916, and has for its object to provide a continuous absorption refrigerating system which is simple, more reliable and economical than that shown in the said application and which is positive in action. To this end, the system is provided with a pump which is employed for returning the strong liquor from the absorber to the generator or still, and which is operated by the gaseous pressure generated in the said still. The pump referred to is preferably of novel construction as will be described, and is included in the system so that there are no moving parts piercing the walls of the refrigerating circuit which is therefore hermetically sealed and free from leaks.

Provision is made for controlling the operation and speed of the pump in response to the pressure in the absorber, as will be described.

Provision is also made for controlling the supply of weak liquor from the still to the absorber by the level of liquid in the latter, as will be described. The system is further provided with valves of novel construction which are responsive to temperature changes for controlling the flow of liquid refrigerant and of the liquid for cooling the gaseous refrigerant as will be described.

These and other features of this invention will be pointed out in the claims at the end of this specification.

Fig. 1 is a diagrammatic view of a refrigerating system embodying this invention.

Fig. 2 a vertical central section of the pump employed in the system shown in Fig. 1.

Fig. 3 a side elevation of the pump shown in Fig. 2, looking toward the right and with the cover removed.

Figs. 4 and 5 details to show the general form of the pump.

Fig. 6 a side elevation of the float valve for controlling the supply of weak liquor to the absorber.

Fig. 7 a vertical section of the valve shown in Fig. 6.

Fig. 8 a plan of the float valve shown in Fig. 6.

Fig. 9 a longitudinal section of a preferred expansion valve for the liquid refrigerant, and Fig. 10 a longitudinal section of a preferred automatic valve for the cooling liquid.

In Fig. 1, I have shown in diagram a continuous absorption refrigerating system or apparatus which in many respects is the same as that shown in the application referred to, and comprises a generator or still 12, a condenser 13, an expansion valve 14 which controls the supply of liquid refrigerant from the condenser 13 to the expansion coil or chamber 15, located in the refrigerating chamber or space 16, and from which gaseous refrigerant passes into the absorber 17 wherein said gaseous refrigerant is absorbed by weak liquor 18, which latter is thus converted into strong liquor.

The present invention has for one of its objects to provide a system in which there are no moving parts piercing the walls of the system, and to this end the system is provided with a simple and efficient pumping apparatus for returning the strong liquor to the generator or still, which pumping apparatus is operated by gaseous pressure generated in the still, whose operation is automatically controlled by the pressure in the absorber 17, and whose moving parts do not pierce the walls of the system as will be described.

The pumping apparatus may and preferably will be made as shown in Figs. 2 to 5, inclusive and comprises a casing 20 provided at one end with a liquid cylinder 21 and at its other end with a gas cylinder 22 which is in alignment with the liquid cylinder 21. The liquid cylinder 21 contains a piston 23 which is connected by a piston rod 24 with a piston 25 in the gas cylinder 22.

The liquid and gas cylinders 21, 22, are connected by an enlarged chamber 26 through which the piston rod 24 is extended and within which is located a helical spring 27, which surrounds the piston rod 24 and bears at one end against the end wall 28 of the chamber 26 and at its other end against the piston 25 in the gas cylinder 22. The spring 27 is compressed by gas pressure admitted into the gas cylinder 22 to effect movement of the pistons 25, 23 in one direction, and extends and moves the said pistons in the opposite direction, when the gas pressure is removed from the piston 25 in the gas cylinder 22. The liquid cylinder 21 is designed to be connected with the absorber 17 to receive strong liquor therefrom, and with the still or generator 12 to deliver the strong liquor thereto. To this end, the liquid cylinder 21 is provided with a head 30 having a liquid inlet port or passage 31, which is connected by a pipe 32 with the absorber 17 for the flow of liquid from the absorber to the port or passage 31, which flow is controlled by an inlet valve 33, preferably made as hereinshown and consisting of a disk valve having a hollow stem 34, whose upper part fits the port or passage 31 and acts to guide the valve in its movements, and whose lower portion is made of smaller diameter than the passage 31 to form an annular groove 35, which communicates with the interior of the hollow valve stem by ports 36. The valve 33 is normally seated by a spring 37.

Upon reference to Fig. 2, it will be seen that when the liquid piston 23 makes its suction stroke under the influence of the spring 27, the inlet valve 33 is opened, and strong liquor is drawn from the absorber into the liquid cylinder 21. The cylinder head 30 is provided with a liquid outlet port or passage 40, which is controlled by an outlet valve 41 having a hollow stem 42, which is provided with an annular groove 43 and with ports 44 connecting said groove with the interior of the hollow stem. The outlet valve 41 is opened by pressure of the liquid within the cylinder 21, and is closed by a spring 45 which has an enlarged convolution 46 resting on the upper end of the valve stem 42. It will thus be seen that the outlet valve 41 is held closed by its spring 45 while the piston 23 is making its suction stroke, and is opened by the liquid in the cylinder 21 while the piston 23 is making its discharge stroke, the liquid being forced out of the cylinder 21 into the annular groove 43 through the ports 44 into the hollow valve stem 42 and from thence into the passage 40 and pipe 47, to the generator or still 12.

The discharge stroke of the piston 23 in the liquid cylinder 21 is effected by gaseous pressure from the still 12, which is admitted into the gas cylinder 22, and the admission of this gas pressure is controlled by an inlet valve 50 in the head 51 of the gas cylinder 22.

The gas inlet valve 50 is located in a gas inlet port or passage 52 in the head 51 and is provided as shown with a hollow stem 53 having an annular groove 54 and ports 55 similar to the liquid inlet and outlet valves. The gas inlet port 52 is connected by a pipe 56 with the still or generator 12.

The gas inlet valve 50 is designed to be normally closed by the gas pressure in the still 12, and to be positively opened initially by the piston 23 in the liquid cylinder 21, and to be further opened substantially in an instant, as will be described.

To this end, the inlet valve 50 has attached to it a rod 58, which is extended through the piston 25 into a chamber or bore 59 in the piston rod 24, and is screw threaded at its upper end to receive a nut 60, which is encircled by a helical spring 61 whose upper end normally projects beyond the nut 60, so as to be engaged by the end wall 62 of the bore 59 before the said end wall engages the nut 60 or rod 58 on the suction stroke of the liquid piston 23. The rod 58 or the nut 60 thereon is arranged to be engaged by the end wall 62 of the bore 59 at or about the time the liquid piston 23 and the gas piston 25 have reached the end of their strokes under the influence of the spring 27, and before the end wall 62 engages the rod 58 or nut 60, it engages the spring 61 and compresses the same, so that the gas inlet valve 50 is initially opened positively by the piston and is further opened substantially in an instant by the expansion of the spring 61, thereby insuring a full opening of the valve substantially in an instant.

When the gas inlet valve 50 is thus opened, gas under pressure from the still 12 enters the cylinder 22 and forces the piston 25 upward against the action of the spring 27 and simultaneously causes the piston 23 to make its discharge stroke and deliver the strong liquor in the cylinder 21 to the still 12. At or about the time the piston 23 has reached the end of its discharge stroke, the gas inlet valve 50 is closed by the piston 25 engaging a nut 64 on the rod 58, which engagement is cushioned by a spring 65. Provision is made for exhausting the gas pressure in the cylinder 22, and to this end the cylinder 22 is provided with an enlargement 66 from which leads an outlet passage 67, with which cooperates a gas outlet valve 68, having a hollow stem 69 provided with an annular groove 70 and ports 71, and said gas outlet valve 68 is connected with the gas inlet valve 50 so as to move simultaneously therewith but in opposite directions thereto, whereby the gas outlet valve is positively closed when the gas inlet valve is opened and vice versa. In the present instance a lever or rocker arm 72 pivoted within the enlargement 66 of the gas cylinder has one end engaged with the rod 58 and its other end engaged with the valve 68. The gas outlet passage 67 discharges into a chamber 74 within the pump casing and normally closed by a cover 75, and said chamber is connected by a pipe 76 with the absorber, and as shown the pipe 76 is connected with the inlet pipe 77 for the absorber, with which the expansion coil is connected. It will thus be seen that the gas pressure employed to drive the pump pistons 25, 23, is discharged from the gas cylinder 22 into the chamber 74 and then into the absorber where it is used to strengthen the weak liquor in the absorber. Provision is made for controlling the action of the pump and for making this control dependent upon the pressure in the absorber. To this end the gas outlet passage 67 leading from the pump to the chamber 74 is provided with a contracted portion formed by the bore 78 of a nipple 79, and said bore has cooperating with it a valve, herein shown as a needle valve 80, which is designed to be opened by the gas discharged from the cylinder 22 and to be positively closed by a device which is responsive to a difference in pressure between the atmosphere and the pressure in the absorber. The device referred to is shown as a Bourdon tube 81 of known construction, which has one end open to the atmosphere, being extended through the side wall of the chamber 74 and secured thereto by the nut 82, see Fig. 3, and the closed end of said tube is connected by a link 83 with one arm of a lever 84, having its other arm extended over the needle valve 80 so as to close the same in response to the movement of the tube 81, in one direction. In the present instance, the bore 78 in the nipple communicates with the chamber 74 through lateral ports 86. The lever 84 is pivoted at 87 to a lever 88 which is pivoted at 89 to the pump casing, and provision is made for adjusting the lever 88 so as to control the operation of the needle valve according to the pressure it is desired to maintain in the absorber.

To this end the lever 88 is moved in one direction by a spring 90 and in the opposite direction by an adjusting rod 91, which is extended through a stuffing box 92 attached to the pump casing and normally closed by a cap 93, which is readily removable to gain access to the rod 91 when it is desired to adjust the mechanism for any particular pressure in the absorber. To illustrate, if it is desired that the absorber should have a pressure of 25 lbs., the apparatus is adjusted so that when the pressure gauge connected with the absorber or with the chamber 74, and which is not herein shown, shows 25 lbs., the needle valve is free to be opened by the gas pressure discharged by the pump, but is closed by the lever 84 when the gas pressure falls below the predetermined amount, to wit, 25 lbs., and the action of the pump is stopped until the gas pressure in the absorber has again risen to or above the predetermined amount.

When the pressure in the absorber falls below the predetermined point, the pump is stopped so as to interrupt the return of liquor from the absorber to the still, inasmuch as the gas pressure in the absorber is below that required to take care of the incoming liquor and charge it to the strength desired. As soon as the pump stops, the weak liquor flowing into the absorber rises therein and provision is made for controlling the flow of weak liquor into the absorber by the level of said liquor therein, as will be described. With the pump stopped and the supply of weak liquor to the absorber shut off, the pressure in the absorber builds up as the gaseous refrigerant continues to flow from the expansion coil to the absorber, and when this pressure rises above the predetermined point, the control apparatus releases the needle valve and the pump again starts to return strong liquor to the still, which lowers the liquid level in the absorber and allows the control apparatus for the weak liquor to operate and establish the flow of weak liquor to the absorber. The action of the control apparatus for the needle valve is not abrupt, so that the starting and stopping of the pump is not abrupt, but on the other hand is gradual. To illustrate, suppose that the absorber has a gas pressure of 30 lbs., and the intent is to maintain 25 lbs. With the pressure at 30 lbs., the pump runs rapidly so as to reduce this pressure, rapidly withdrawing the strong liquor from the absorber and allowing more weak liquor to flow into the absorber. As the gas pressure in the absorber is reduced, the needle valve is gradually moved toward its closed position and the pump is thus caused to run slower and slower by this throttling action of the needle valve as the gas pressure approaches the predetermined amount, to wit, 25 lbs. In this manner the pump is gradually stopped and gradually started again.

It will thus be seen that the speed of the pump increases and decreases as the pressure in the absorber increases and decreases. As stated above, the supply of weak liquor to the absorber is controlled by an apparatus responsive to the level of the liquid in the absorber, and in the present instance I have illustrated a construction of apparatus preferred by me. The apparatus referred to is shown in Figs. 6, 7 and 8 and conventionally in Fig. 1.

Referring to Figs. 6 to 8, 90 represents a float located in a chamber 91 provided with a weak liquor inlet pipe 92, which extends up into the float chamber 91 and has attached to its upper end a valve casing 94 containing a valve 95 which controls the outlet port 96 for said casing. The valve 95 is provided with a hollow stem 97 having an external annular groove 98 and ports 99, and said valve is designed to be seated by a spring 100 within the valve casing. The valve 95 is provided with a rod or projection 101, which extends through a cap 102 attached to the valve casing and forming a support for a series of levers 103, 104, 105, one of which as 103 engages the projection 101 and another of which as 105 is provided with forks or arms 106, which straddle the cap 102 and are connected by links or rods 107 with the float 90. The system of levers is such that when the float 90 rises on the inlet pipe 92, the lever 103 is turned so as to relieve the valve from pressure and permit the latter to be closed by the spring 100, and when the float is lowered, the lever 103 is forced against the projection 101 to open the valve.

The float 90 is responsive to the level of the liquid in the float chamber 91 which is connected by the pipe 108 with the absorber, so that, when the level of the weak liquor in the absorber reaches a predetermined level therein, namely at the point where the pipe 108 is connected with the absorber, the liquid in the float chamber reaches its maximum level and the valve 95 is closed. When the level of the liquid in the absorber falls below the mouth of the inlet pipe 108, the level of the liquid in the float chamber is lowered and the valve 95 is opened. The float chamber 91 is connected with the still 12 for the flow of weak liquor from the still to the float chamber, and preferably the weak liquor supply pipe 92 includes a vessel 110 and a coil 112, which latter is located in a vessel 113 included in the strong liquor return pipe 47 for the pump. The vessel 113 and coil 112 form one form of heat exchanger, and the vessel 110 cooperates with a coil 114 therein to form another heat exchanger, the coil 114 forming part of the circuit for cooling water, which circuit comprises the water supply pipe 115 leading to the coil 116 in the condenser 13, the pipe 117 connecting the condenser coil 116 with the cooling coil 118 in the absorber 17, the pipe 119 connecting the coil 118 with the coil 114 in the heat exchanger 110, and the return pipe 120.

The expansion valve 14 may and preferably will be of the construction shown in Fig. 9, wherein the valve proper 122 is opened by a bellows 123 having its movable head 124 provided with a rod 125, which engages a projection 126 on the valve 122. The bellows 123 contains a suitable fluid which is expanded by a rise in temperature in the refrigerated space 16 and moves the head 124 to open the valve 122, which is closed by a spring 130, when the bellows contracts by the lowering of the temperature in the refrigerated space.

The thermostatic valve 121 in the cooling water circuit is of similar construction, and comprises a bellows 131 containing a fluid sensitive to temperature changes, and provided with a movable head 132 having a rod 133, which cooperates with the valve proper 134 to open the same, and which is closed by a spring 135. The still or generator 12 may be heated in any suitable or desired manner, as for instance after the manner shown in the application referred to.

The operation of the system may be briefly described as follows: The gaseous refrigerant separated in the generator or still 12 flows through the pipes 56 and 140 to the condenser 13, wherein it is condensed, and the liquid refrigerant thus formed flows through the pipe 141, and expansion valve 14 to the expansion coil 15, wherein it is converted into gaseous refrigerant, which flows into the absorber 17 through the inlet pipe 77. The gaseous refrigerant in the absorber converts the weak liquor into strong liquor, which latter is drawn through the pipe 32 into the liquid cylinder 21 of the pump, and is discharged therefrom through the pipe 47, into the heat exchanger 113, from which it passes into the still 12.

The weak liquor in the still is forced by the gas pressure in the still out through the pipe 92 and coil 112, to the heat exchanger 110, from which it flows into the float chamber 91 and thence by pipe 108 into the absorber 17. The flow of cooling liquid through the heat exchanger coil 114 and the condenser coil 116 is controlled by the thermostatic valve 121 as above described.

From the above description, it will be seen that the strong liquor in the absorber is positively returned to the still by the pump, which is operated by gas pressure generated in the still, and that the moving parts of the pump are located in the circuit for the refrigerant and do not pierce the walls of said circuit, whereby the danger of leaks is avoided and the circuit hermetically sealed. It will also be observed that the pump is controlled by the pressure in the absorber, and that the supply of weak liquor to the absorber is controlled by the level of the liquor in the absorber.

It will also be observed that the gas inlet and gas outlet valves are not only positively opened and closed but that each valve in its closed position is maintained in such position by a superior gas pressure. When the gas inlet valve 50 is closed as shown in Fig. 2, the gas pressure in the still is superior to that in the pump and consequently this superior pressure tends to keep the gas inlet valve closed.

When the gas outlet valve 68 is closed, the gas inlet valve 50 is opened and the pressure in the pump is superior to that in the absorber, consequently the gas outlet valve 68 is held closed by a superior gas pressure, which also acts to hold the inlet valve 50 in its open position by reason of the mechanical connection between the two valves. Furthermore because of the mechanical connection between the gas inlet and gas outlet valves, the inlet valve when closed acts as a stop for the outlet valve in the open position of the latter and vice versa.

So also the closing movement of the outlet valve is started by the inlet valve rod 58 through the rocker arm 72, and is then closed substantially in an instant by the spring 61 at the time the inlet valve 50 is opened wide substantially in an instant, so that both valves work simultaneously and at such rapid rate that there is practically no moment when both valves are opened.

Claims:

1. In a refrigerating apparatus, in combination, a still, an absorber, a condenser, and an expansion chamber connected together for the flow of refrigerant from the still through the condenser and expansion chamber into the absorber, means for connecting the still with the absorber to permit the weak liquor in the still to be forced into the absorber by the gas pressure in the still, a pump having a liquid inlet connected with said absorber for the flow of strong liquor to the pump, a liquid outlet connected with the still, a gas inlet connected with the still, and a gas outlet connected with the absorber for the flow of gas from the pump into the absorber to admix with the weak liquor therein.

2. In a refrigerating apparatus, in combination, a still, an absorber, a pump connected with said absorber and still for returning strong liquor from the absorber to said still, and means responsive to the pressure in the absorber for controlling the operation of said pump.

3. In a refrigerating apparatus in combination, a still, an absorber, and a pump connected with said absorber and still for the return of strong liquor from the absorber to said still, and also connected with said still and absorber for the admission into said pump of gas pressure generated in said still and for the exhaust of said gas pressure from the pump to the absorber, and a valve for interrupting the flow of the exhaust gas pressure from the pump to the absorber whereby the operation of said pump may be stopped.

4. In a refrigerating apparatus, in combination, a still, an absorber, and a pump connected with said absorber and still for the return of strong liquor from the absorber to said still, and also connected with said still and absorber for the admission into said pump of gas pressure generated in said still and for the exhaust of said gas pressure from the pump to the absorber, and a valve responsive to the pressure in the absorber for controlling the operation of said pump.

5. In a refrigerating apparatus, a pump having a liquid cylinder and a gas cylinder, a piston in said liquid cylinder, a piston in said gas cylinder, a piston rod connecting said pistons, and a spring to move said pistons and rod in one direction, automatically operated inlet and outlet valves controlling the passage of liquid into and out of said liquid cylinder, inlet and outlet valves controlling the passage of gas into and out of said gas cylinder, means for connecting said gas inlet and outlet valves to cause them to be operated reversely, and means for operatively connecting the said gas inlet and outlet valves with said piston rod to be positively operated thereby.

6. In a refrigerating apparatus, a pump having a liquid cylinder and a gas cylinder a piston in said liquid cylinder, a piston in said gas cylinder, a piston rod connecting said pistons, and a spring to move said pistons and rod in one direction, automatically operated inlet and outlet valves controlling the passage of liquid into and out of said liquid cylinder, inlet and outlet valves controlling the passage of gas into and out of said gas cylinder, means for connecting said gas inlet and outlet valves to cause them to be operated reversely, and means for operatively connecting the said gas inlet and outlet valves with said piston rod to be positively operated thereby, and a valve for controlling the passage of gas from said gas cylinder independently of the said gas outlet valve.

7. In a refrigerating apparatus, a pump having a liquid cylinder and a gas cylinder and a chamber connected with said gas cylinder, a piston in said liquid cylinder, a piston in said gas cylinder, means for connecting said pistons to cause them to be operated simultaneously, inlet and outlet valves for said liquid cylinder, inlet and outlet valves for said gas cylinder, means for connecting said gas inlet and outlet valves to cause them to be operated reversely, means for operatively connecting said gas and inlet valves with said pistons for enabling said gas valves to be positively operated by said pistons, a throttle valve for controlling the passage of gas from the gas cylinder into said chamber independently of said gas outlet valve, and mechanism responsive to the pressure in said chamber for operating said throttle valve.

8. In a refrigerating apparatus, a pump having a liquid cylinder and a gas cylinder and a chamber connected with said gas cylinder, a piston in said liquid cylinder, a piston in said gas cylinder, means for connecting said pistons to cause them to be operated simultaneously, inlet and outlet valves for said liquid cylinder, inlet and outlet valves for said gas cylinder, means for connecting said gas inlet and outlet valves to cause them to be operated reversely, means for operatively connecting said gas and inlet valves with said pistons for enabling said gas valves to be positively operated by said pistons, a throttle valve for controlling the passage of gas from the gas cylinder into said chamber independently of said gas outlet valve, mechanism responsive to the pressure in said chamber for operating said throttle valve, and means for adjusting said mechanism to enable the throttle valve to be closed at different pressures.

9. In a refrigerating apparatus, a pump having a liquid cylinder, and a gas cylinder, a piston in said liquid cylinder, a piston in said gas cylinder, means for connecting said pistons, inlet and outlet valves for said liquid cylinder, inlet and outlet valves for said gas cylinder, means for connecting said gas inlet and outlet valves to cause them to be operated reversely, means for operatively connecting said gas inlet and outlet valves with said pistons for initially opening and closing the same, and means rendered effective by said pistons for completing the opening and closing movements of said gas valves substantially in an instant.

10. In a refrigerating apparatus, in combination, a still, an absorber, and a pump connected in circuit with said absorber and still for the passage of strong liquor from the absorber to the still and for the passage of gas generated in the still into the pump to operate the same and from said pump to said absorber, said circuit having its walls unpierced by moving parts of said pump.

In testimony whereof, I have signed my name to this specification.

CHARLES W. HAPGOOD.